United States Patent [19]
Kokkonen et al.

[11] Patent Number: 5,116,423
[45] Date of Patent: May 26, 1992

[54] APPARATUS FOR WASHING PULP

[75] Inventors: Seppo K. Kokkonen; Harri T. Qvintus, both of Savonlinna, Finland

[73] Assignee: A. Ahlstrom Corporation, Noormarkku, Finland

[21] Appl. No.: 485,134

[22] Filed: Feb. 26, 1990

Related U.S. Application Data

[63] Continuation-in-part of Ser. No. 28,273, Mar. 20, 1987, Pat. No. 4,919,158.

[30] Foreign Application Priority Data

Mar. 20, 1986 [FI] Finland .................. 861167

[51] Int. Cl.⁵ ............................ D21C 9/06
[52] U.S. Cl. .......................... 134/15; 8/156; 68/158; 68/181 R; 68/184; 210/210; 210/211; 210/215; 210/216; 210/297; 210/327; 210/409; 210/411
[58] Field of Search .............. 68/158, 181 R; 134/15

[56] References Cited

U.S. PATENT DOCUMENTS

| | | | |
|---|---|---|---|
| 4,266,413 | 5/1981 | Yli-Vakkuri | 68/158 |
| 4,502,171 | 3/1985 | Koskinen et al. | 681/181 R |
| 4,750,340 | 6/1988 | Anderson | 681/181 R |
| 4,894,121 | 1/1990 | Luthi et al. | 68/158 |
| 4,919,158 | 4/1990 | Kokkonen et al. | 134/15 |

Primary Examiner—Asok Pal
Attorney, Agent, or Firm—Toren, McGeady & Associates

[57] ABSTRACT

The present invention relates to a method and an apparatus for washing pulp according to which method the pulp is supplied onto a movable liquid-pervious support surface to form a substantially continuous layer; and washing liquid is supplied to the pulp layer and passed in several successive washing phases through different areas of the layer in such a way that the washing liquid gradually flows in the opposite direction compared with the flow direction of the pulp layer. According to the invention the washing liquid is divided in two or more partial flows which pass alternately through different washing phases in such a way that the washing liquid which in one phase has passed through the pulp layer flows past at least the washing phase preceding it in the flow direction of the pulp layer. The apparatus of the invention preferably includes a rotating cylinder having a casing surface of which serves as the liquid-pervious support surface for the pulp.

13 Claims, 4 Drawing Sheets

APPARATUS FOR WASHING PULP

RELATED APPLICATIONS

This application is a continuation-in-part of application Ser. No. 07/028,273, filed Mar. 20, 1987, now U.S. Pat. No. 4,919,158.

FIELD AND BACKGROUND OF THE INVENTION

The present invention relates to an apparatus for washing pulp, said apparatus operating in such a way that a substantially continuous layer of pulp is supplied onto a movable, liquid-pervious support surface and washing liquid is supplied to the pulp layer and fed through different areas of the layer in several successive washing stages in such a way that the washing liquid gradually flows in the opposite direction compared to the flow direction of the layer.

The basic structures of the above-type apparatus are disclosed, for example, by U.S. Pat. Nos. 4,266,413, 4,292,123 and 4,769,986. The washing apparatus of these references employs a rotating cylinder surrounded by a stationary shell. The pulp to be washed flows in a substantially continuous web between the casing surface of the cylinder and the shell. The pulp is supplied onto the cylinder at a predetermined inlet point and is discharged from it at an outlet point further on in the rotating direction, while the washing liquid is supplied to the last washing stage close to the outlet of the pulp, from which stage the washing liquid gradually flows through successive washing stages in the direction opposite to the flow direction of the pulp and is discharged to a discharge pipe close to the pulp inlet point.

The basic structures and principles of another apparatus of the above-mentioned type are disclosed, for example, by U.S. Pat. Nos. 4,539,827 and 4,154,644. Both references relate to so called belt washers having a substantially horizontal Fourdrinier type liquid pervious belt as a pulp support surface. Said documents describe a countercurrent washing method where the direction of the flow of the pulp is opposite to the main flow direction of the washing liquid. Both references also disclose washing apparatuses performing several successive washing stages. A characterizing feature of these prior art washers is the manner the washing liquid is fed through the entire system. Both specifications show that the fresh washing liquid is introduced to the pulp layer in the beginning of the last washing stage. The displaced liquid is then collected and fed back to the beginning of the penultimate washing stage. This is continued as long as the displaced liquid from the second washing stage is introduced in the beginning of the first washing stage and the displaced liquid is thereafter removed from the system. In other words, a washing stage receives washing liquid in only one concentration and the displaced liquid is, in principle, collected to one receptacle per washing stage, whereby the concentration of the filtrate is thus equalized.

Several successive washing stages, i.e. several separate displacement operations, are necessary in the washing of pulp as channels are formed in the pulp layer and the washing efficiency of the washing liquid thus falls. In other words, the amount of chemicals and other impurities to be removed from the suspension does not decrease enough during only one displacement stage. Each stage, however, when using ordinary washing equipment, increases the time required for washing the pulp and thus reduces the capacity of the washing plant. This is partly due to the countercurrent washing principle used commonly in washing pulp. It means that fresh washing liquid is introduced to the last washing stage where the suspension contains less chemicals than in the earlier stages. Thus the liquid that has performed a displacement operation once in the last washing stage and been collected after said stage contains such an amount of chemicals that it may be introduced to the previous washing stage i.e. second but last washing stage. The amount of chemicals etc. in the suspension in said washing stage exceeds the one in said washing liquid whereby a successful displacement operation can be performed. This way the same washing liquid can perform three or four (usually) displacements so that the suspension will be washed in said three or four washing stages. It has, however, been found out that the cleanliness of the suspension after said three or four washing stages is not necessarily satisfactory, but one more washing stage should be performed to have the cleanliness to a sufficient level.

SUMMARY OF THE INVENTION

It is an object of the present invention to provide an apparatus capable of performing the following method according to which the pulp still is washed in several successive stages but which improves the efficiency and the speed of the washing compared with known methods, without impairing the result of the washing.

A basic feature of the method, disclosed more closely in the parent application, is that the washing liquid is divided in two or more partial flows, said number corresponding to the number of washing phases within a washing stage. The partial flows of washing liquid are arranged to pass through the pulp layer in the washing stages alternately in such a way that a partial flow of the washing liquid which has passed through the pulp layer in a washing stage flows past at least the washing phase preceding it in the flow direction of the pulp layer. More generally, said partial flow passes a number of washing phases, said number being the number of washing phases within a washing stage subtracted by one. In other words, if the washing stages of a washing apparatus include three washing phases each and a certain partial flow passes through the pulp layer in the second washing phase, the collected liquid is arranged to pass the first washing phase of said washing stage and also the third, i.e. the last washing phase of the previous washing stage. Said partial flow has thus passed two washing phases and been introduced thereafter to the second washing phase of the previous washing stage.

According to the operation of the apparatus, the washing liquid to be used may be divided for example in two partial flows each of which flows through every two washing phases so as to pass the liquid through all the successive washing phases. When the liquid is divided in the last washing stage where the introduced washing liquid is clean, the cleaner washing liquid fraction being drained from the last washing phase is led to the later phase of the two phases of the previous washing stage in which later phase the pulp is cleaner, and the fraction containing more impurities to the earlier one of the previous phases in which the pulp is dirtier.

The washing of pulp is, according to the invention, preferably carried out by a movable liquid pervious surface with which the pulp layer is arranged to be moved, said surface being provided with appropriate feeding means for the washing liquid and collecting means for receiving the filtrate having been displaced from the pulp layer. Said feeding means and collecting means are arranged in such a way that the desired operation of the apparatus is achieved.

A preferred embodiment of the apparatus is formed of a rotating cylinder having a liquid-pervious casing surface; a stationary shell extending in the direction of the axis of the cylinder and surrounding the cylinder so as to allow the pulp to flow between the cylinder and the shell in a layer along said casing surface, and through which shell the washing liquid can be supplied to the pulp layer; at least one inlet pipe for the washing liquid connected to the shell close to the discharge of the washed pulp; compartments under the casing surface of the cylinder into which the washing liquid filtered through the pulp layer is collected; a valve system connected to said compartments and consisting of a part rotating with the cylinder and of a stationary part disposed against the cylinder; pipes which begin from said stationary part and which, during operation of the washing apparatus, communicate with the compartments of the drum and which are connected to different places in the shell surrounding the cylinder so as to feed the washing liquid during operation of the washing apparatus in successive washing phases at said places through the pulp layer at the same time as the liquid gradually flows in the opposite direction compared with the flow direction of the pulp; and a discharge pipe beginning from said stationary part, via which pipe the washing liquid can be discharged from the apparatus.

The preferred embodiment of an apparatus in accordance with the present invention comprises pipes feeding the liquid from one washing phase to another between the stationary part of the valve system and the shell surrounding the cylinder, said pipes being connected so as to divide the washing liquid in two or more partial flows which pass through different washing stages whereby a washing liquid which in one phase has passed through the pulp layer flows past at least the washing phase preceding it in the flow direction of the pulp.

Also, an apparatus in which the pulp supporting surface is disposed in a plane, e.g. a horizontal movable endless wire, may be used.

The invention is described further below with reference to the accompanying drawings, which illustrate preferred embodiments of the apparatuses for carrying out the method disclosed in the parent application.

DESCRIPTION OF THE PREFERRED EMBODIMENTS

Figure 1:
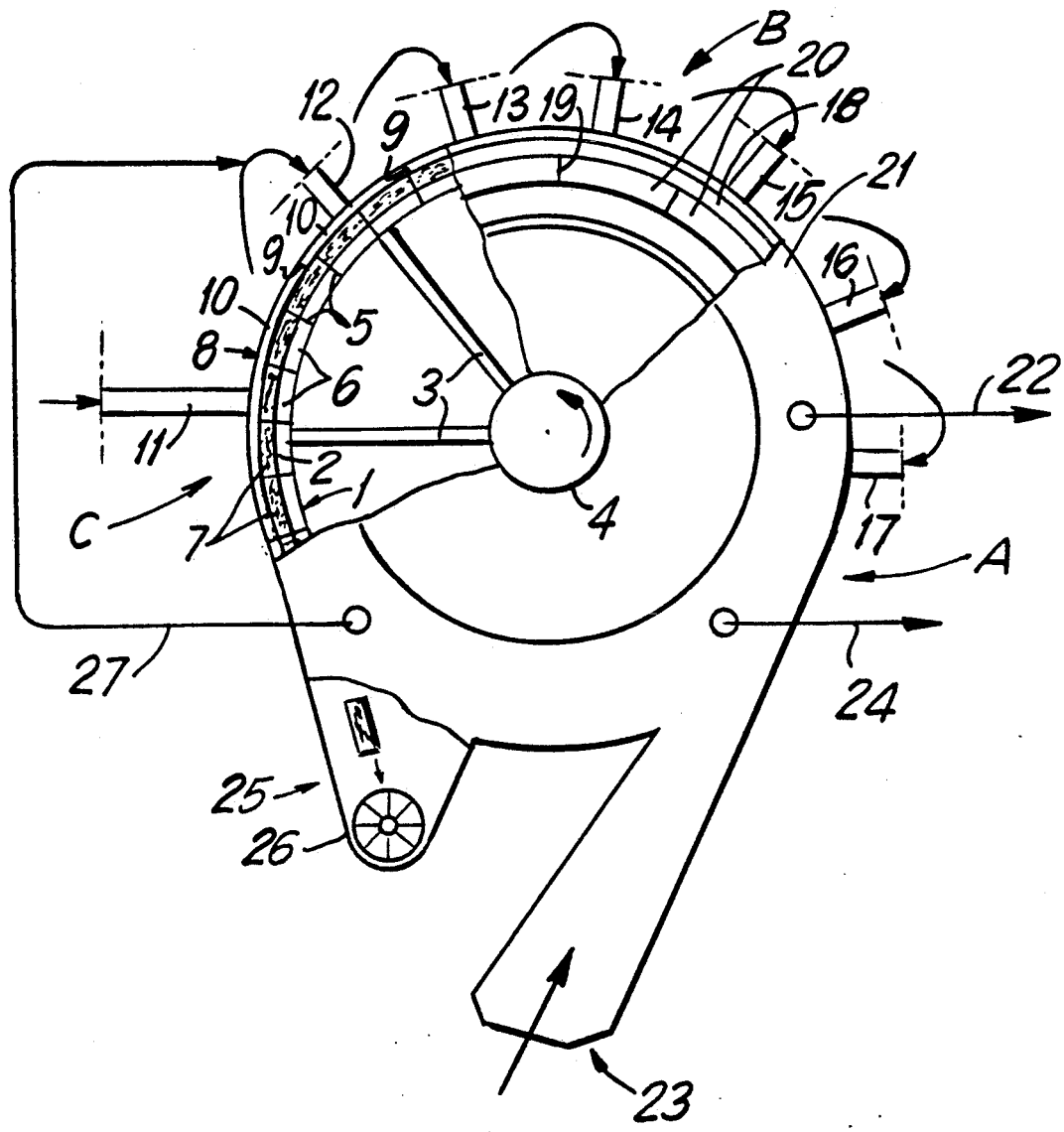
FIG. 1 is a longitudinal view of a preferred embodiment of the present invention in partial section of different areas.
Figure 2:
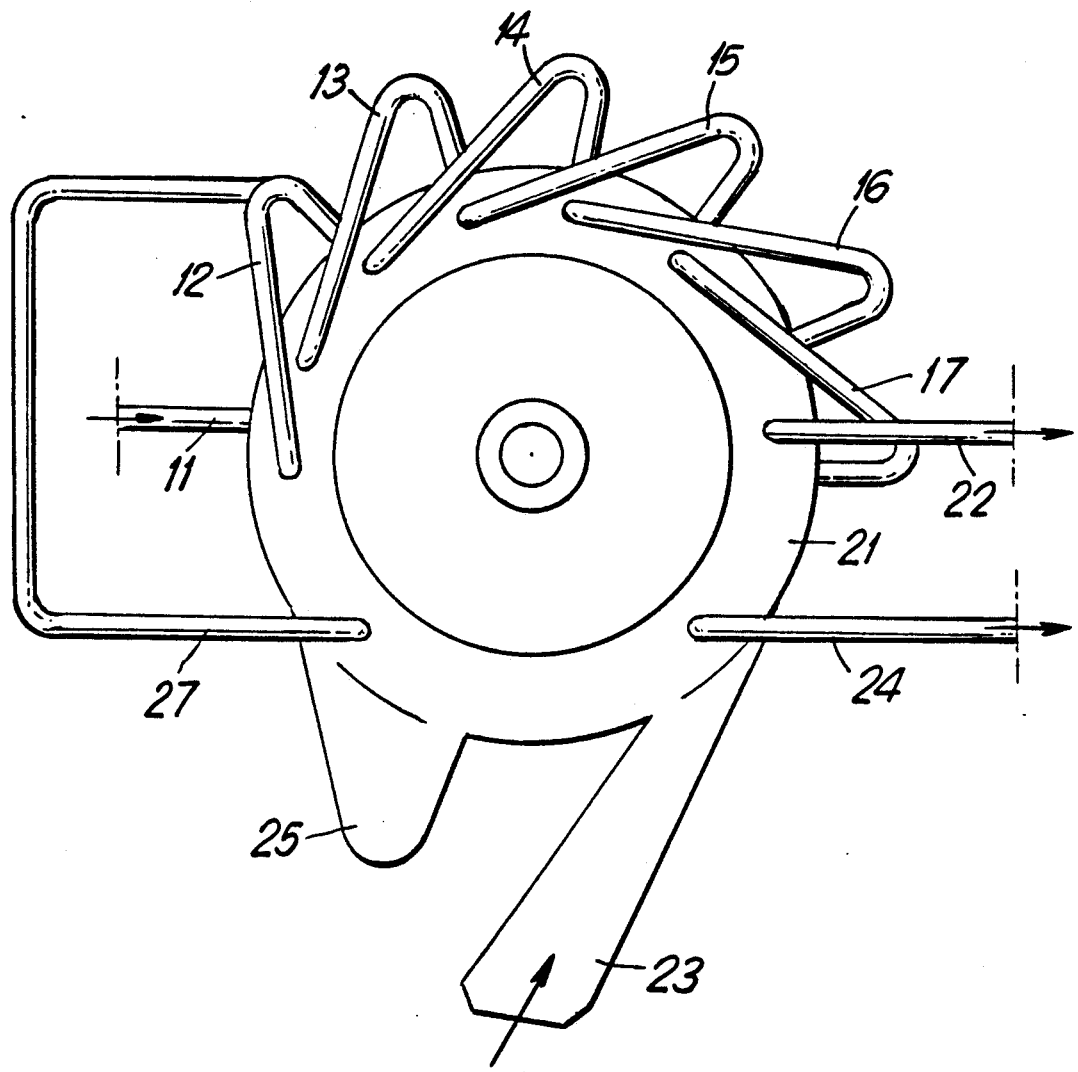
FIG. 2 is an end view of the apparatus of FIG. 1.
Figure 3:
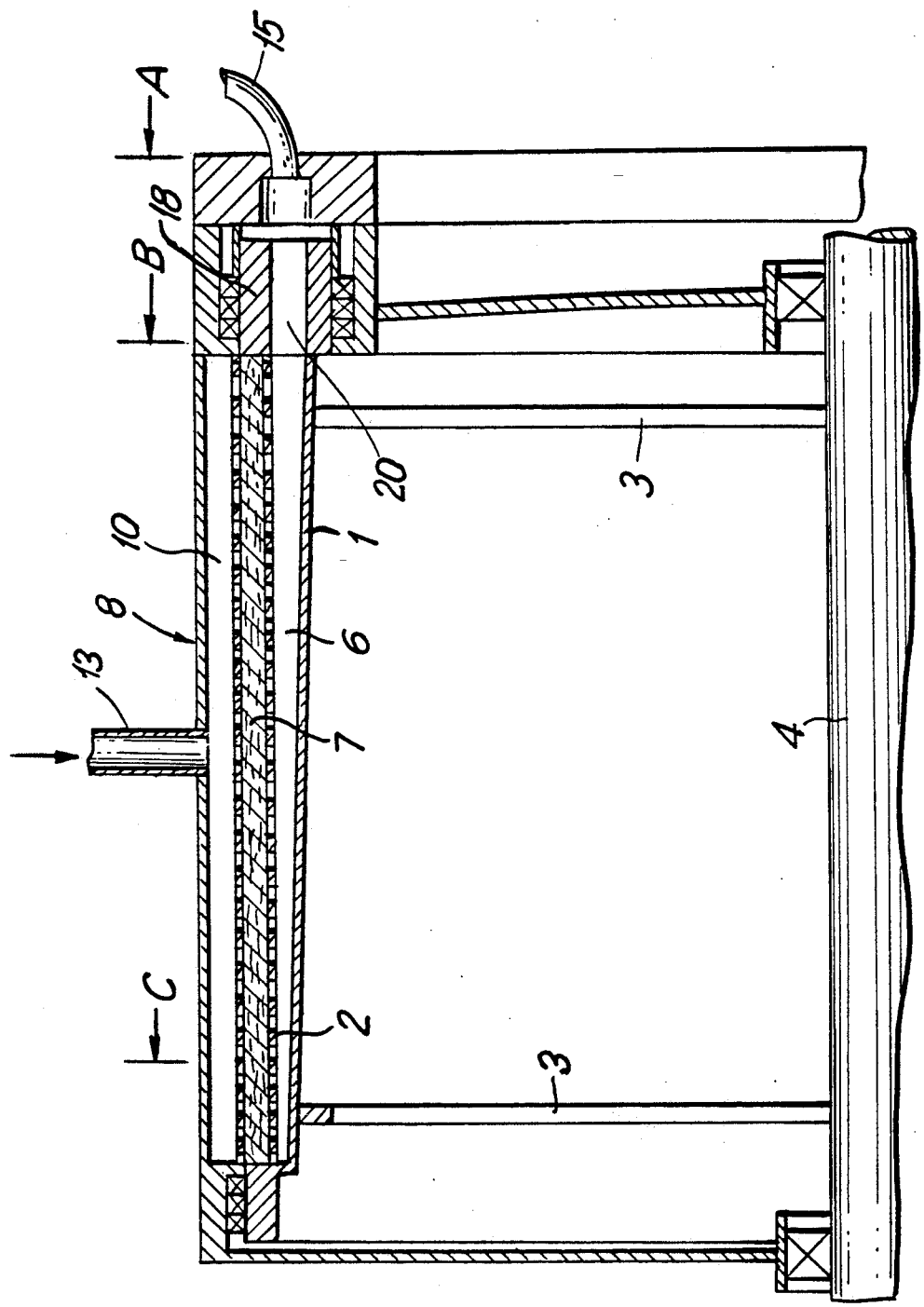
FIG. 3 is an axial section of an apparatus of FIG. 1.

The washing apparatus illustrated in FIGS. 1, 2 and 3 is a rotating cylinder surrounded by a stationary shell. The cylinder and its shell are substantially similar to the ones disclosed in the U.S. Pat. No. 4,769,986. The differences are to be found mainly in the pipes between the valve system and the shell, which are described further below.

The disclosed apparatus comprises, as illustrated in FIG. 1, a cylindrical drum 1, the casing surface 2 of which is connected via radial rods 3 to a horizontal shaft 4. The casing surface 2 is preferably a liquid-pervious perforated plate. Under the casing surface 2 there are longitudinal i.e. axial compartments 6 which are separated from each other by intermediate walls 5 which are parallel with the shaft 4 of the drum. The bottoms of the compartments incline towards the other end of the drum as illustrated in FIG. 3. Said intermediate walls 5 extend, as FIG. 1 shows, radially outward from the casing surface 2 of the drum to form said compartments 6 and so as to divide the pulp to be washed being supplied onto the casing surface, substantially in rectangular cakes 7.

The drum 1 which rotates about its shaft 4 in the direction indicated by the arrow A in FIG. 1 is surrounded by a stationary substantially cylindrical shell 8 which is coaxial with the shaft 4 of the drum 1. The shell 8 comprises compartments 10 which are defined by radially inward extending intermediate walls 9, as FIG. 1 shows, which walls are parallel with the shaft 4 of the drum, each compartment being provided with a feed pipe 11 to 17 for the liquid used for washing the pulp. The bottom of the compartments 10 arranged against the pulp layer 7, which is to be washed and is supported by the casing surface 2, is made of a liquid-pervious perforated plate.

The operation principle of the apparatus of the present invention is to feed the washing liquid several times through the pulp layer 7 supplied onto the casing surface 2 of the drum 1 while the washing liquid gradually flows through the whole washing apparatus in the direction opposite to the rotating direction A of the drum. To achieve this, the apparatus is provided with a valve system at the other end of the drum 1, which system communicates via orifices with the compartments 6 under the casing surface 2 of the drum 1, to which compartments the washing liquid passed through the pulp layer in its several stages and phases is collected. The valve system illustrated more closely in FIG. 3 comprises an annular part 18 which is a direct extension of the compartments 6 and is stationarily fixed with the drum 1 and rotates with it. Part 18 comprises an annular space divided by seals or intermediate walls 19 (FIG. 1) in compartments 20 so as to connect each compartment 20 with several adjacent compartments 6. The number of such compartments 6 corresponds to the number of the compartments collecting the washing liquid from a single washing phase. Further, the valve system comprises an annular stationary part 21, which is disposed against said part 18 connected to the drum 1, and which is stationarily fixed with the shell 8 surrounding the drum 1, and from which said feed pipes 12 to 17 for the washing liquid communicating with the compartments 10 in the shell 8 begin. Further (in FIG. 1), pipe 22 serving as the discharge pipe for the washing liquid, begins from said part 21.

The pulp to be washed in the apparatus is supplied as a fibre stock of a consistency of approx. 1 to 10% through the inlet 23 onto the casing surface 2 of the drum 1. At this stage a portion of the liquid contained in the stock is separated through the perforated surface 2 of the drum, drained in a compartment 6 and removed by said valve system to discharge pipe 24. Thus a fibre layer 7 the solids content of which is approx. 8 to 12% is produced onto the casing surface 2 of the drum 1. This layer is transported by the drum between the drum 1 and the shell 8 via successive washing phases to a discharge end 25 for the washed pulp, at which end the pulp is for example by pneumatic blast detached from the casing surface of the drum to a gutter 26. The washing liquid removed from the pulp between the last washing phase and the pulp discharge point is guided via the valve system to a pipe 27 which guides it to a previous washing phase as described further below.

For the wash of the pulp layer 7, washing liquid is fed via the inlet pipe 11 to the compartment 10 which is close to the pulp discharge end 25 in the shell 8. This compartment, the size of which is, in accordance with this embodiment, where each washing stage has been divided to two washing phases, approximately twice the size of the other compartments 10 in the shell 8, covers entirely the last washing stage i.e. the area of the two last washing phases of pulp. The washing liquid supplied pressurized to the compartment 10 is pressed through the perforated bottom of said compartment and further into the pulp layer 7 displacing the liquid therefrom. The displaced liquid is then drained through the casing surface 2 of the drum to compartments 6 collecting the washing liquid. From the compartments 6 the washing liquid flows to two compartments 20 in the part 18 of the valve system connected to the drum. Actually the number of compartments 20 receiving the drained liquid from compartments 6 define the number in which the washing liquid is divided and the number of phases within a stage. From compartments 20 the washing liquid flows further to two pipes 12 and 13 (cf. FIG. 2) beginning from the stationary part 21 of the valve system. Thus the washing liquid is divided in two partial flows, one of which, viz. the one passed through, i.e. been displaced (in pipe 12) from, the last washing phase, is cleaner that the other one, viz. the partial flow passed (in pipe 13) through the penultimate washing phase. The pipes 12 and 13 pass the partial flows of washing liquid to the two preceding next compartments 10 in the shell 8, in the range of which the second but last washing stage, in other words the two preceding washing phases are carried out. As FIG. 2 shows, the washing liquid from the last washing phase, to which the washing liquid displaced from the pulp after the washing phase is supplied via pipe 27, is brought in pipe 12 to the later one of said two preceding washing phases and thus it washes in that phase cleaner pulp than the more contaminated washing liquid which is received from the penultimate washing phase and is supplied via pipe 13 to the earlier one of said two washing phases. After this the washing continues according to the same principle and the partial flows of washing liquid pass alternately through successive washing stages in such a way that the washing liquid which has in one stage passed through the pulp layer 7 flows past the washing phase immediately preceding said phase in the flow direction of the pulp; thus each partial flow passes through every two washing phases. Finally, the washing liquid is collected from the two washing phases of the first washing stage next to the pulp inlet 23 to a discharge pipe 22.

Figure 4:
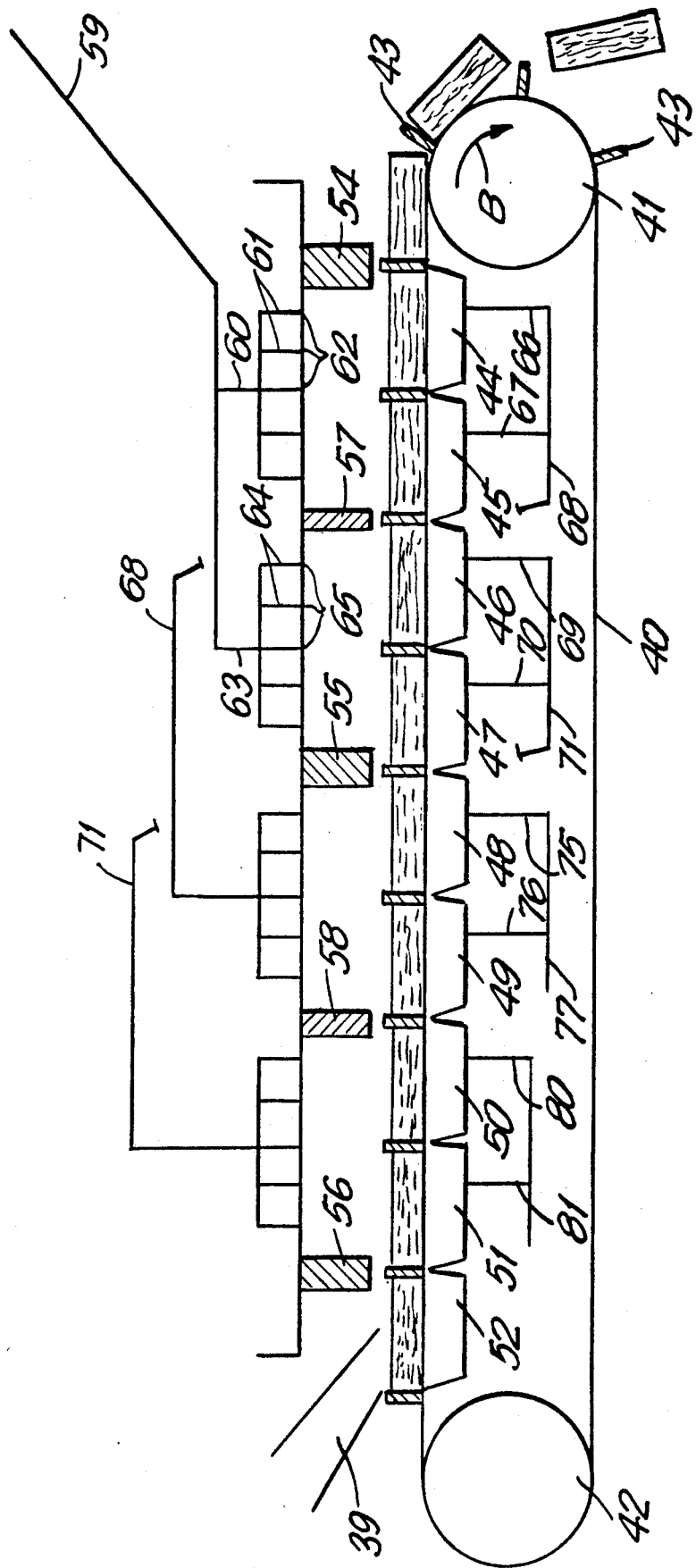
FIG. 4 is a simplified schematic side view of another preferred embodiment of the present invention.

FIG. 4 illustrates in a simplified manner another preferred embodiment of the present invention, namely a horizontal belt-type washer. The embodiment relates to an apparatus having two washing stages both being divided in two washing phases. The embodiment discloses an apparatus having two breast rolls 41, 42 and a moving liquid pervious support surface in the form of a belt 40 arranged round said rolls. The rotational direction of the rolls is shown by arrow B. The pulp to be washed is introduced on the belt essentially above the roll 42 from the feed box 39, from where the suspension flows over the entire width of the belt 40. The belt is preferably provided with wall members 43 perpendicular to the surface of the belt 40 and also perpendicular to the direction of movement of the belt. Said wall members extend preferably over the entire width of the belt. Said wall members 43 with the belt define rectangular lengthy spaces for the pulp. Under the belt 40 between the rolls 41, 42 there has been arranged a number of stationary collecting troughs 44–52 extending substantially over the entire width of the belt for receiving liquid being displaced from the pulp layer 7. Above the belt there has been arranged stationary members 54–56 for separating different washing stages from each other. Distance between said separating members 54–56 is substantially equal to a distance between a number of wall members 43 on the belt 40. Said washing stages i.e. the area between separating members 54 and 55 and between members 55 and 56 is divided in two areas i.e. washing phases by dividing members 57 and 58.

The fresh washing liquid is brought via conduit 59 to the apparatus. Inside the apparatus said liquid is divided in two flows to conduits 60 and 63. Conduit 60 introduces the washing liquid via ducts 61 to nozzles 62 to be sprayed over the last washing phase of the last washing stage. In a similar manner washing liquid via conduit 63 is introduced to nozzles 65 via ducts 64 and sprayed over the penultimate i.e. first washing phase of the last washing stage. It is, however, to be noted that the washing liquid for the last washing stage can be sprayed or in some other appropriate manner introduced into the pulp layer as an undivided flow due to the fact that its concentration equals to 0 whether is was divided or not.

The washing liquid being introduced on the pulp layer in the last washing phase of the last washing stage displaces the liquid from the pulp making it drain to the collecting troughs 44 and 45. The drained liquid is discharged from said troughs by means of conduits 66 and 67 and combined to a common conduit 68. Similarly, the washing liquid introduced on the pulp layer in the penultimate washing phase displaces liquid and makes it drain to troughs 46 and 47. The thus drained liquid is discharged by means of conduits 69 and 70 and combined to conduit 71.

The once displaced portions of liquid in conduits 68 and 71 are introduced further in such a way that conduit 68 leads to the last washing phase of the penultimate washing stage i.e. the first washing stage in this case and conduit 72 to the first washing phase of the first washing stage. Similarly to the last washing stage the portions of liquid are introduced to the pulp layer, drained liquid portions collected and at this stage combined and removed via conduit 82.

It is to be noted that each trough 44–47 receives a liquid having different concentrations, the lowest being in trough 44. Thus it would be possible not to combine liquids from troughs 44 and 45 or 46 and 47 as explained above, but to feed each portion individually further i.e. creating more washing phases.

It is apparent to a person skilled in the art that the embodiments of the invention are not limited by the presented example but modifications can be made of it within the scope of protection defined by the appended patent claims. Thus, the washing liquid may be divided in three or more separate partial flows, which are brought according to the presented principle alternately to different washing phases. Also, the alternation of the partial flows of this invention need not extend to the whole washing process but can be combined for example with the method disclosed in U.S. Pat. No. 4,769,986 according to which the washing liquid passes in one undivided flow from one washing phase to another. Also the construction of the apparatus used in the washing can be different from the one presented in the above examples. For example a cylinder as disclosed in U.S. Pat. Nos. 4,266,413 and 4,292,123 can be used, in which the compartments, disposed under the casing surface of the cylinder and collecting the washing liquid, are connected via pipes to a valve system provided immediately about the shaft of the drum.

What is claimed is:

1. An apparatus for countercurrent washing of pulp, where the pulp moves in a first direction and a washing liquid moves in a second direction, said second direction being substantially opposite to said first direction and where washing is performed in a number of washing stages, the apparatus comprising:
   a liquid pervious support surface for the pulp to be washed;
   means for feeding washing liquid to a pulp layer;
   means for collecting the liquid being displaced from said pulp layer;
   means for separating a number of washing stages from each other arranged outside the pulp layer with respect to said liquid pervious surface;
   means for dividing the liquid being displaced from at least one of the washing stages into at least two partial flows;
   means for guiding said partial flows separately to a preceding washing stage; and
   means for introducing said partial flows to the pulp layer in said preceding washing stage in a corresponding order as received from a washing stage, so that at least two washing phases have been created.

2. The apparatus as defined in claim 1, wherein said means for dividing the liquid includes a number of troughs within a washing stage arranged on a side opposite said liquid pervious surface with respect to the pulp layer.

3. The apparatus as defined in claim 1, wherein said means for guiding said partial flows includes conduits having one end connected to said means for dividing the liquid and another end connected to the means for introducing said partial flows onto the pulp layer.

4. The apparatus as defined in claim 1, wherein said means for introducing said partial flows onto the pulp layer includes nozzles arranged within a washing phase at an opposite side of the pulp layer with respect to the liquid pervious surface.

5. The apparatus as defined in claim 1, wherein said liquid pervious surface is arranged to have a rotationally symmetrical form.

6. The apparatus as defined in claim 5, wherein the liquid pervious surface is arranged to have one of a cylinder, a core and a barrel form.

7. The apparatus as defined in claim 1, wherein said liquid pervious surface is a substantially horizontal belt arranged on two breast rolls.

8. The apparatus as defined in claim 7, wherein said belt has wall members which are perpendicular to a direction of movement of said belt and which extend over the entire width of said belt.

9. An apparatus for countercurrent washing of pulp, where the pulp moves on a liquid pervious support surface in a first direction and a washing liquid moves in a second direction, said second direction being substantially opposite to said first direction and where washing is performed in a number of washing stages each being divided in at least two washing phases, comprising:
   stationary wall means for separating said washing phases within a washing stage;
   stationary feeding means arranged between said wall means for introducing washing liquid to the pulp layer;
   stationary collecting means arranged on an opposite side of said moving liquid pervious support surface with respect to said feeding means for receiving displaced washing liquid from said washing phases, the number of collecting means corresponding to the number of said phases; and
   ducts for feeding washing liquid from said collecting means to said feeding means, said ducts connecting said collecting means of the washing phases of a washing stage in a corresponding order to said feeding means of the washing phases of the preceding washing stage, so that both said washing stages are divided to same number of washing phases.

10. The apparatus as defined in claim 9, wherein said liquid pervious support surface is a belt arranged on two breast rolls.

11. The apparatus as defined in claim 9, wherein said liquid pervious support surface is arranged to have a rotationally symmetrical form.

12. The apparatus as defined in claim 11, wherein the liquid pervious surface is arranged to have one of a cylinder, a core and a barrel form.

13. An apparatus for countercurrent washing of pulp, comprising:
   a rotating cylinder with a liquid-pervious casing surface;
   a stationary shell coaxial with said cylinder and surrounding said cylinder so as to allow said pulp to flow as a layer between said shell and said cylinder with said liquid-pervious casing surface, a washing liquid being suppliable through the shell to the pulp layer;
   at least one inlet pipe for the washing liquid, said inlet pipe being connected to said shell close to a discharge point for the washing liquid;
   compartments disposed under the casing surface of the cylinder for collecting the washing liquid seeping through the pulp;
   a valve system connected to said compartments and having a part rotating with said cylinder and a stationary part disposed against said rotating part;
   a discharge pipe beginning from said stationary part, via which pipe the washing liquid is discharged from the apparatus; and
   pipes beginning from said stationary part, said pipes during operation communicating with different compartments of the cylinder and being connected to various points in the shell surrounding the cylinder so as to feed the washing liquid during operation in successive washing stages at said points through the pulp layer while the liquid gradually flows in a direction opposite to the flow direction of the pulp, said pipes passing the washing liquid from one washing stage to another and being disposed between the stationary part of the valve system and shell surrounding the cylinder, and being connected for dividing the washing liquid into two or more partial flows passing alternatively through different washing stages and causing the washing liquid, which has passed through one washing phase, to pass by at least the washing phase preceding it in the flow direction of the pulp.

* * * * *